Sept. 2, 1952 U. F. LUEBBEN 2,608,883
VEHICLE POWER TRANSMISSION SYSTEM
Filed July 14, 1949 6 Sheets-Sheet 2

Inventor
U. F. Luebben
By Rudolph L. Lowell
Attorney

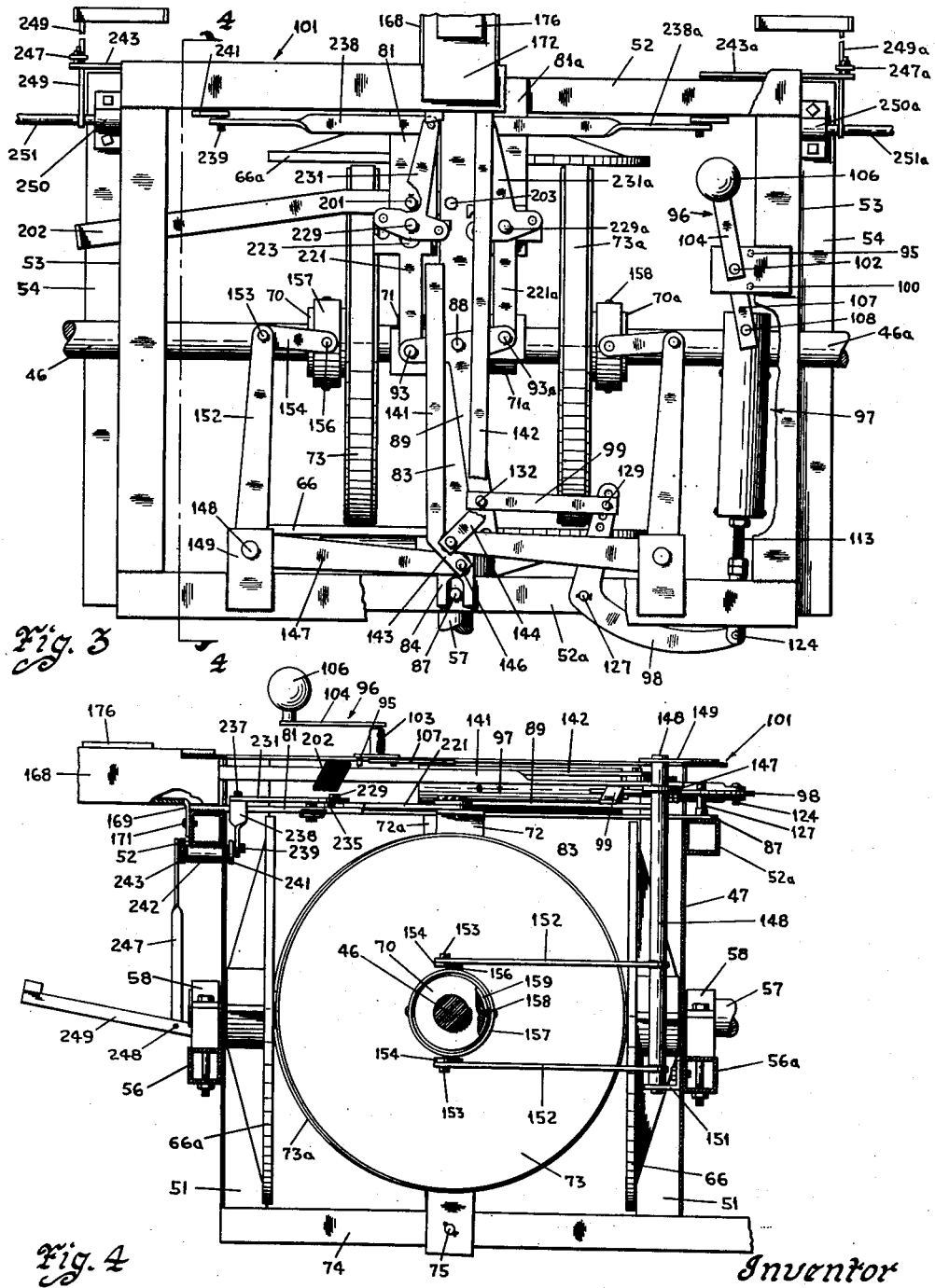

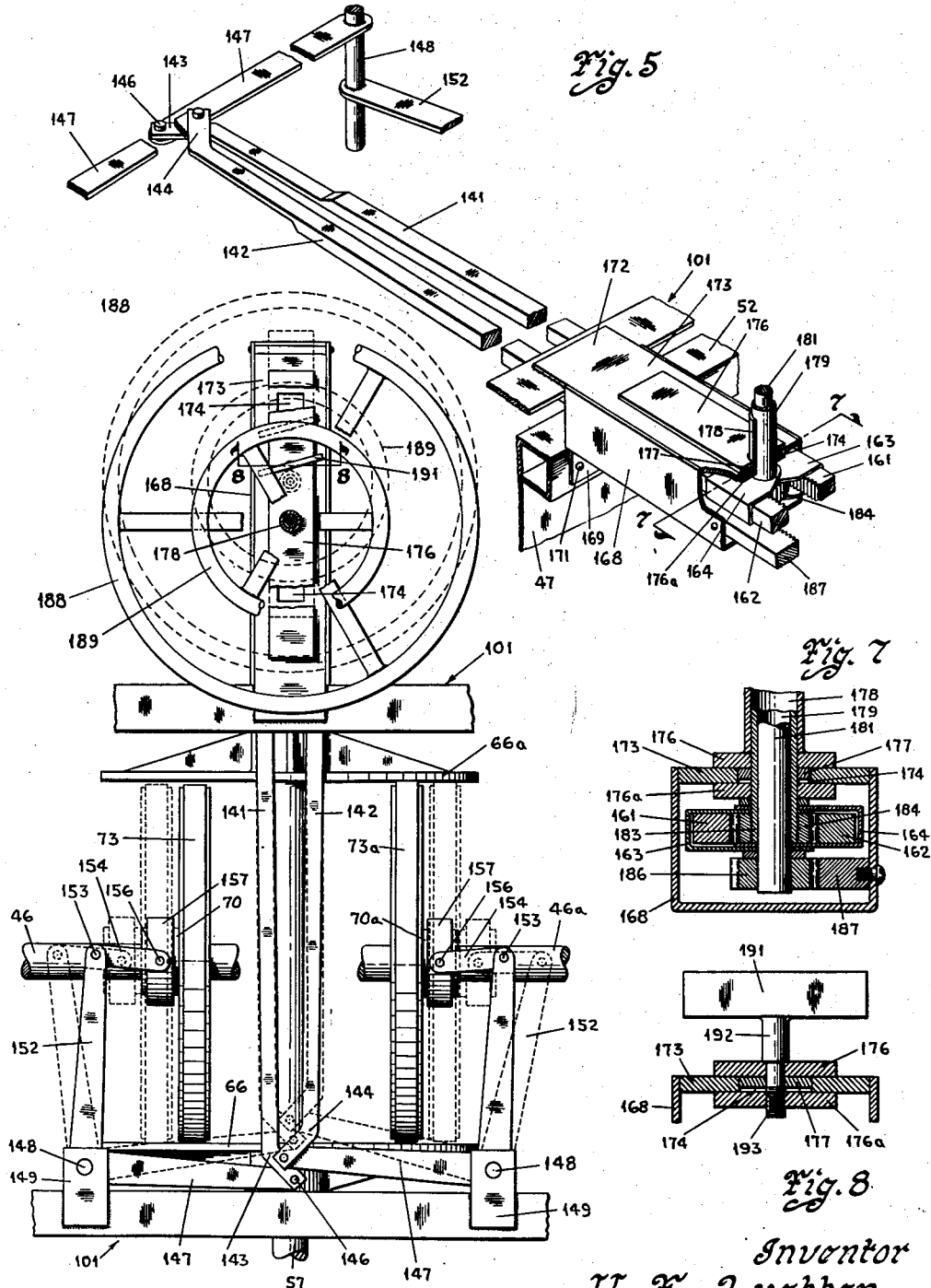

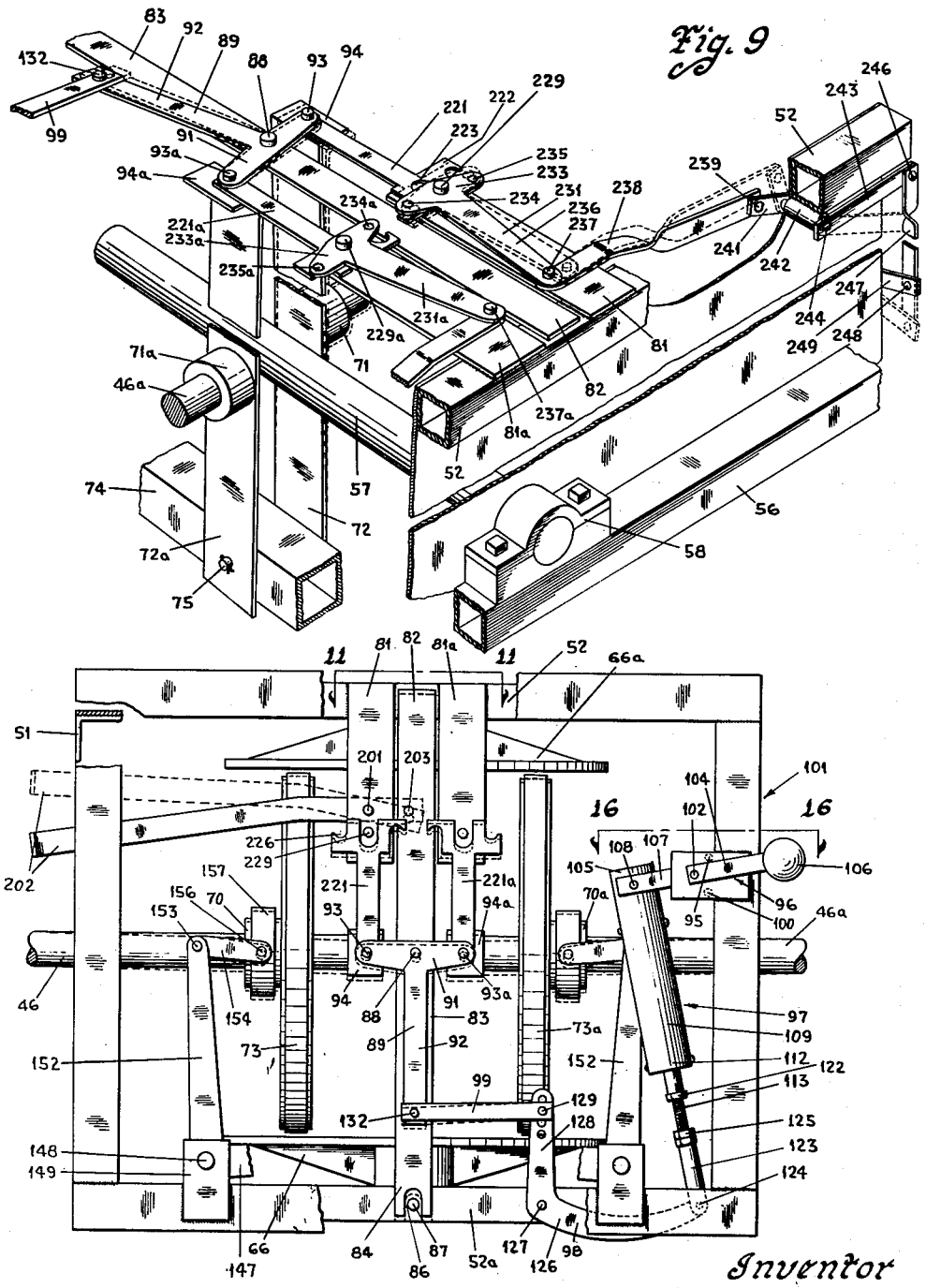

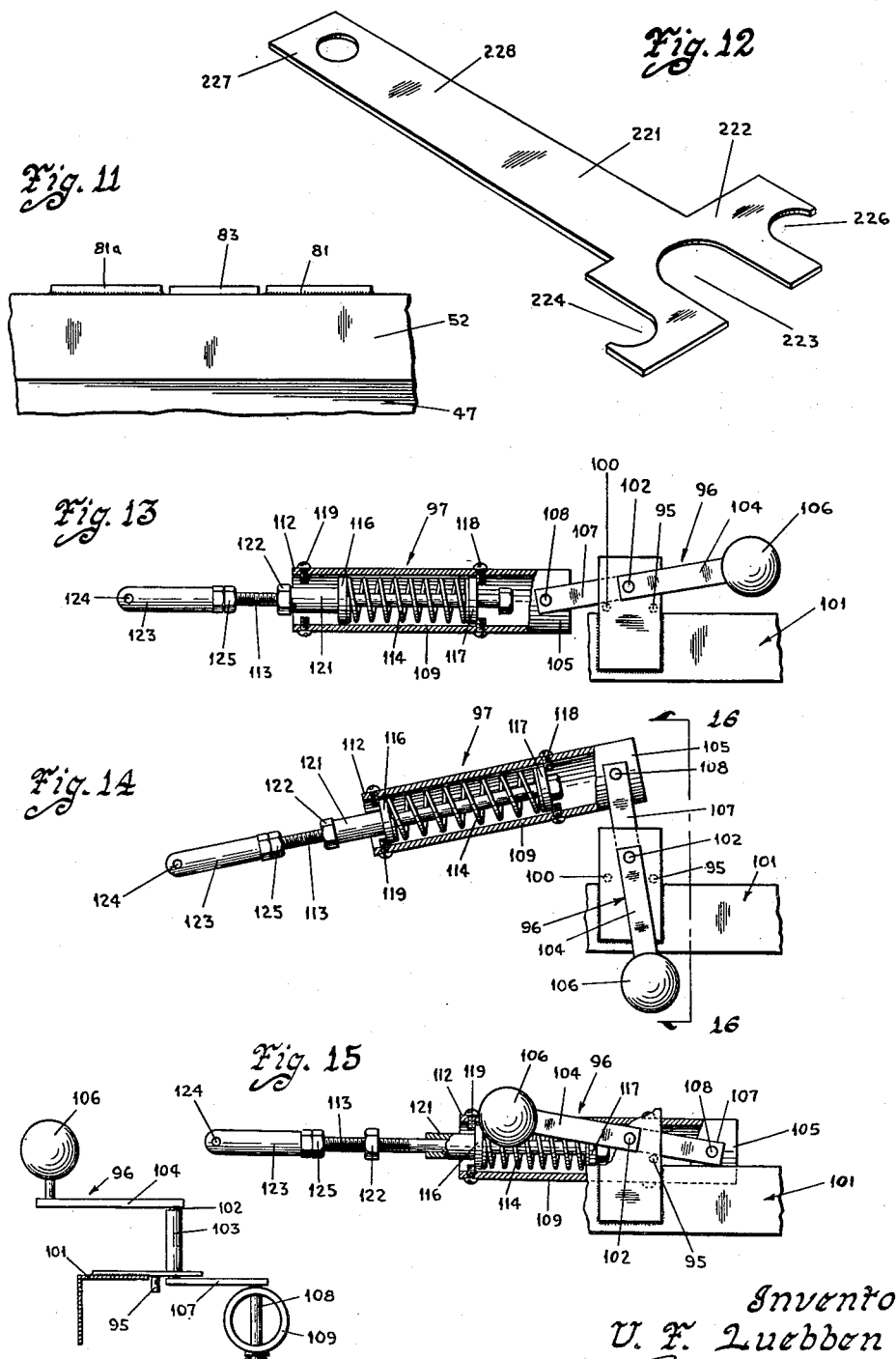

Patented Sept. 2, 1952

2,608,883

UNITED STATES PATENT OFFICE 2,608,883

VEHICLE POWER TRANSMISSION SYSTEM

Ummo F. Luebben, Omaha, Nebr.

Application July 14, 1949, Serial No. 104,763

5 Claims. (Cl. 74—721)

This invention relates generally to a vehicle power transmission system and in particular to a combination power transmission and steering system for a three-wheel farm tractor having a pair of oppositely arranged traction wheels and a castor or swiveled ground-engaging wheel spaced from the tractor wheels longitudinally of the tractor.

Farm tractors now in common use, although generally satisfactory in operation, have been found to be objectionable in certain respects. One of these objections results from the usual front wheel steering system which necessitates a relatively large turning radius for the tractor. This requirement is particularly objectionable for work on row crops or in close quarters. Further objection arises because of the location of the usual tractor seat above the tractor rear axle and rearwardly of the tractor engine. Since farm implements are either drawn by the tractor, supported near the front end of the tractor, or carried on the tractor at a position behind the rear axle, the tractor operator can observe the action of the implement only by maneuvering into a position to look forwardly and down along one side of the tractor, or by frequently turning around and then looking down. Either of these conditions is fatiguing and inconvenient to the tractor operator. Further, following a row or a line of an irregular contour, difficulties are encountered due to the fact that the path followed by the implement is not directly responsive to the steering of the tractor. In other words, compensation in the steering of the tractor must be made in an effort to have the implement follow a predetermined path.

It is an object of this invention, therefore, to provide an improved farm tractor in which an implement carried by the tractor is in full view of the tractor operator and steerable directly in response to a steering movement of the tractor.

Another object of this invention is to provide a combination power transmission and steering system for a three-wheel farm tractor capable of operating the tractor in reverse directions at varying speeds, of turning the tractor through a complete circuit about one of its traction wheels as a center, and of reversing its direction of travel within a turning radius defined substantially by the width of the tractor track, namely, the distance between traction wheels arranged at opposite sides of the tractor.

A further object of this invention is to provide a farm tractor having a power transmission system of a construction such that a farm implement carried thereon is controlled as a self-propelled unit.

Another object of this invention is to provide a power transmission system for a three-wheel tractor having a pair of oppositely arranged traction wheels and a free swiveling castor wheel, in which the traction wheels are independently driven and capable of being driven at the same speed, or relative speeds, in either a forward or reverse direction, and with variations in speed or direction being accomplished without the use of any differential or clutch mechanism.

Still a further object of this invention is to provide a power transmission device for a tractor having a pair of traction wheels in which a tractor brake means is associated with the transmission system such that on actuation of an individual foot brake means for each traction wheel, power to the wheel corresponding to the actuated foot brake is cut off as the braking of such wheel is initiated whereby to eliminate any stalling of the tractor motor or any damage to the transmission system as a result of the sudden application of the brake.

Yet another object of this invention is to provide a tractor in which a power transmission system for the traction wheels is of a simple and rugged construction, immediately and directly responsive to the control of the operator to maneuver the tractor for steering, reversing or speed changes, and in which changes in the operation of the tractor can be made quickly and smoothly and with complete safety to the tractor and to the tractor operator.

A feature of this invention is found in the provision of a power transmission system of friction type for a vehicle having a pair of oppositely arranged traction wheels, in which a power shaft is equipped with a pair of spaced friction discs. A pair of drive shafts, normal to the power shaft and arranged between the friction discs are independently connected with a corresponding traction wheel. Each drive shaft carries an axially movable friction wheel which is frictionally engageable with one or the other of the friction discs. Further, the drive shafts are movable axially of the power shaft to frictionally engage and disengage the wheels from the discs. The friction wheels, by virtue of their axial movement on the drive shafts and the movement of the drive shaft axially of the power shaft, are movable individually into frictional engagement with a corresponding disc to accomplish a concurrent forward or reverse operation of the traction wheels, and movable together or relative to one another axially of their respective drive shafts to vary the speed of rotation of the traction wheels for tractor speed change and steering purposes in either a forward or reverse travel of the tractor.

A further feature of this invention is found in the provision of a power transmission system of friction type for a three-wheel farm tractor having a pair of oppositely arranged traction wheels and a ground-engaging castor wheel, in which a power shaft has a pair of fixed friction discs operatively associated with a pair of movably supported friction wheels, adapted to be frictionally engaged with one or the other of the friction discs, and independently connected with a corresponding traction wheel. An actuating unit for moving the friction wheels to positions providing for a reverse, and forward travel of the tractor, and to a neutral position in which the friction wheels are out of frictional engagement with the friction discs, is of an overcenter or toggle action type and is connected with the friction wheels through means including a spring connection so that the friction wheels are held against the discs with equal pressure.

Yet another feature of this invention is found in the provision of a power transmission system for a tractor, which is readily adjustable to provide for the operation of the tractor in a reversed direction with all of the facility and ease of maneuverability of a forward direction of operation.

Further objects, features an advantages of this invention will become apparent from the following description when taken in connection with the accompanying drawings, in which:

Fig. 3 is an enlarged plan view of the power transmission and steering system taken substantially along the line 3—3 in Fig. 1, with certain parts being broken away to more clearly show its construction;

Fig. 4 is a sectional view taken substantially along the line 4—4 in Fig. 3;

Fig. 5 is a fragmentary foreshortened detail perspective view showing the actuating means for operating the steering and speed-change mechanisms in the system of this invention;

Fig. 6 is a plan view, illustrated similarly to Fig. 3, but having certain parts removed and other parts added so as to more specifically show only the speed change and the steering mechanisms embodied in the transmission system of this invention;

Fig. 7 is a sectional detail view taken along the line 7—7 in Fig. 5;

Fig. 8 is an enlarged sectional detail view as seen along the line 8—8 in Fig. 6;

Fig. 9 is a fragmentary perspective detail view of that part of the system of this invention which provides for the braking of the tractor traction wheels;

Fig. 10 is a plan view illustrated similarly to Fig. 3, but having certain parts removed so as to more specifically show the mechanism embodied in the system of this invention which provides for the turning movement of the tractor within a space defined by the distance between the traction wheels of the tractor;

Fig. 11 is an enlarged detail view taken along the line 11—11 in Fig. 10;

Fig. 12 is a detail perspective view of an equalizing member which forms a part of the braking mechanism shown in Fig. 9;

Fig. 13 is an enlarged sectional detail view of a shift lever and spring-connection assembly which forms part of the means for controlling the forward and reverse operation of the tractor;

Figs. 14 and 15 are sectional detail views illustrated similarly to Fig. 13 and showing changed positions of the shift lever and spring-connection assembly;

Fig. 16 is a sectional detail view as seen along the line 16—16 in Fig. 10 or Fig. 14; and Fig. 17 is an enlarged sectional view taken on line 17—17 in Fig. 2 and showing a part of the braking mechanism.

Figure 1:
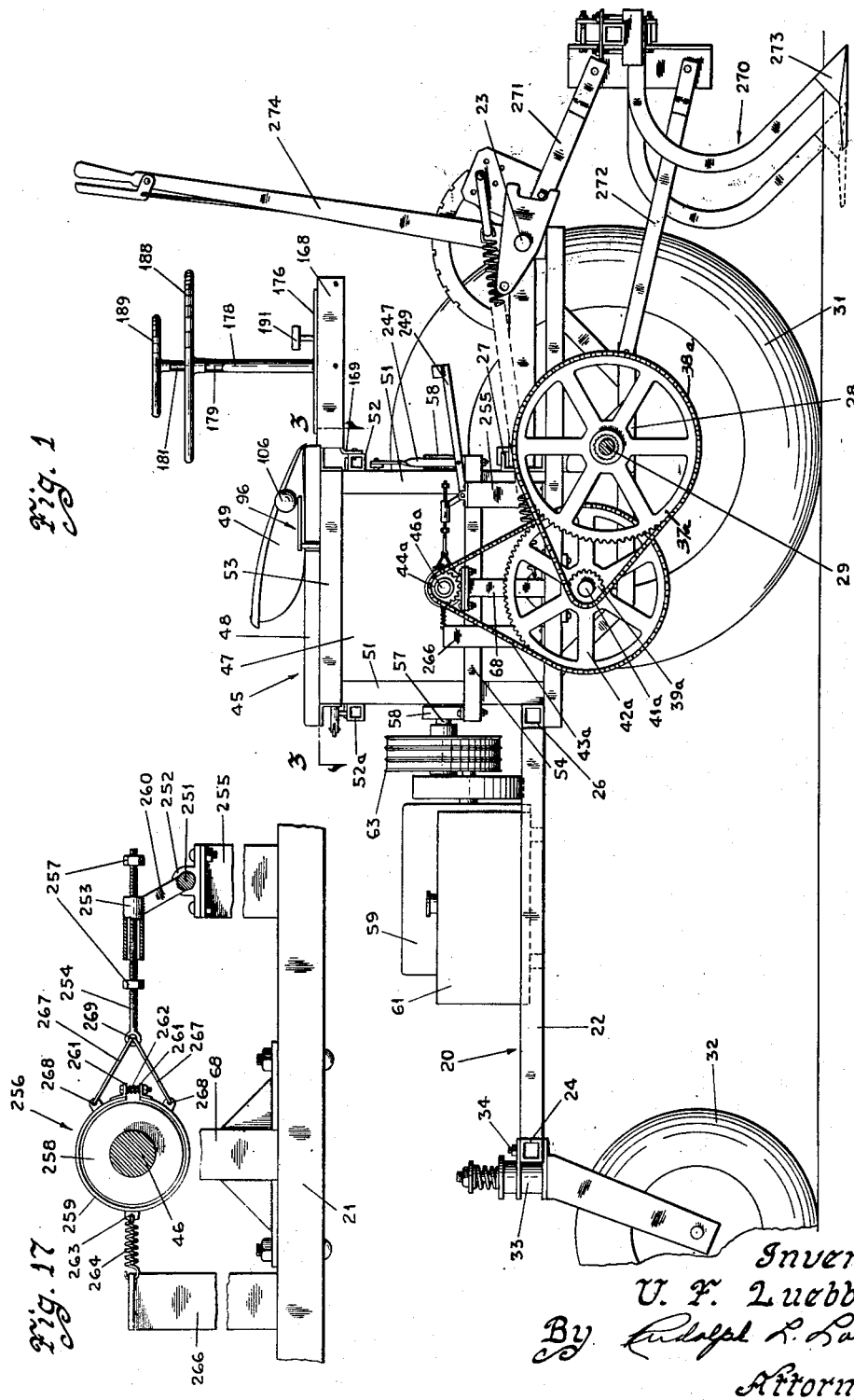
Fig. 1 is a foreshortened side elevational view of a tractor showing the combination power transmission and steering system of this invention in assembly relation therewith, with certain parts being broken away and others being shown in section for the purpose of clarity.
Figure 2:
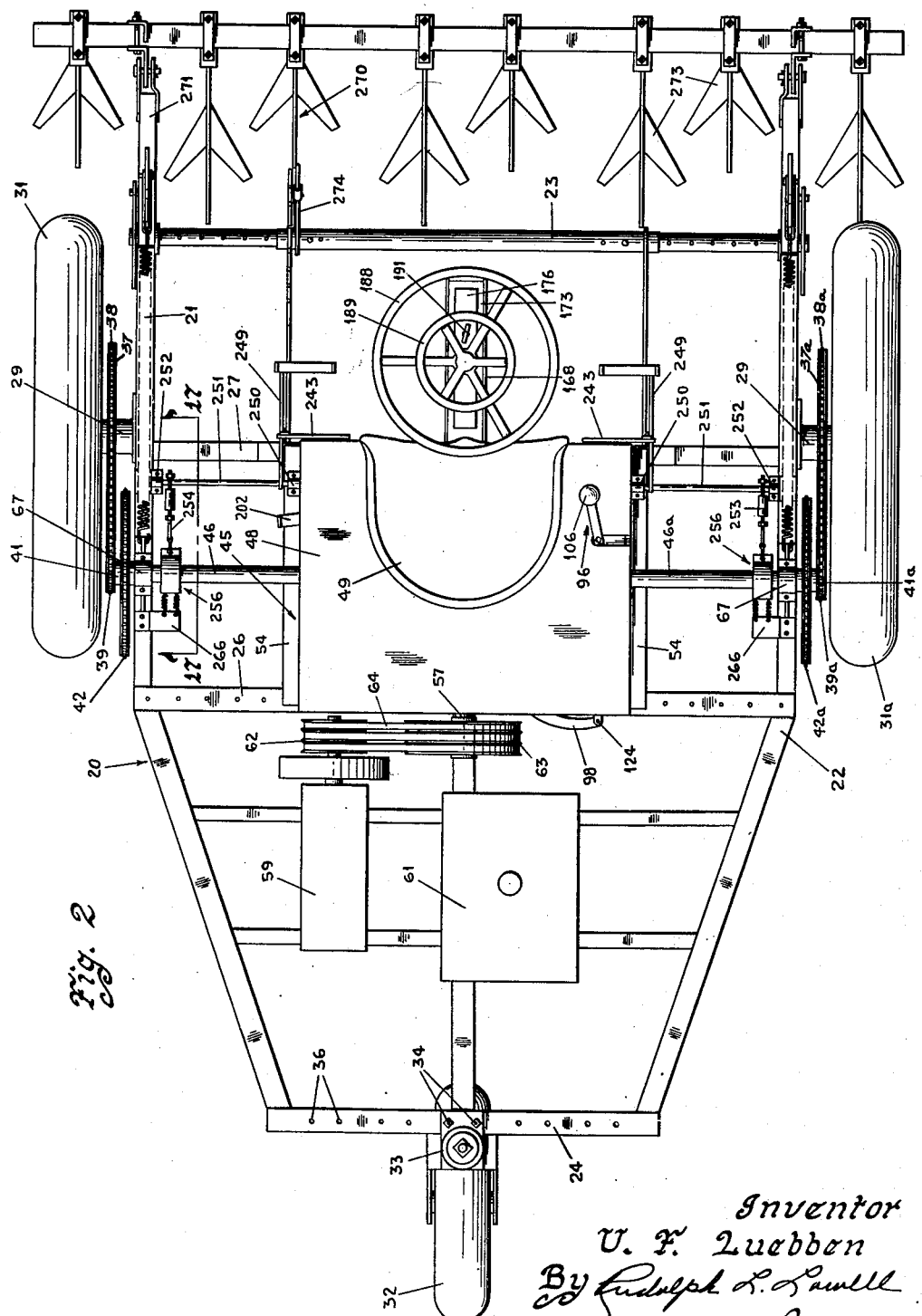
Fig. 2 is a plan view of the assembly shown in Fig. 1.

With reference to the drawings the combination power transmission and steering system of this invention is shown in Figs. 1 and 2 in assembly relation with a three-wheel farm tractor having a main frame, designated generally at 20, comprised of a pair of longitudinal frame members 21 and 22, front and rear transverse members 23 and 24, respectively, and a pair of intermediate transverse members 26 and 27. Supported from the longitudinal frame members, at positions over the front end portions thereof, are sub-frame structures 28 for independently carrying wheel axles 29. Mounted on the axles 29 are a pair of oppositely arranged traction wheels 31 and 31a which support the front end of the main frame 20.

The rear end of the main frame is supported by a ground-engaging castor wheel 32 which is pivotally mounted in a bracket 33 secured to the rear transverse frame member 24 as by bolts 34 inserted through selected ones of a series of holes 36 formed in the transverse member 24. In other words, the castor wheel is adjustably secured at any position over the complete length of the rear transverse member 24, depending upon the farming operation to be performed by the tractor.

Mounted on each wheel axle 29, inwardly of a corresponding traction wheel 31 and 31a are sprocket gears 37 and 37a which are connected through chains 38 and 38a with sprocket gears 39 and 39a fixed on stub shafts 41 and 41a. The stub shafts 41 and 41a are supported from the longitudinal frame members 21 and 22, respectively, at positions rearwardly of their associated wheel axles 29. Second gears 42 and 42a on the stub-shafts 41 and 41a are connected through chains 43 and 43a with sprocket gears 44 and 44a mounted on drive shafts 46 and 46a. The drive shafts 46 and 46a form part of the power transmission system of this invention, which will now be described.

This system, indicated generally at 45 in Figs. 1 and 2, includes a housing 47 of a substantially square-box shape having an open bottom and a top closed by a cover member 48 provided with a seat 49 for the tractor operator. The supporting frame for the housing comprises upright corner members 51 of an angle iron construction secured at their lower ends to the intermediate transverse members 26 and 27. These upright corner members 51, adjacent their top ends, are connected together by transversely extended tubular members 52 and 52a and longitudinally extended angle members 53. Intermediate their ends the upright angles 51 are connected together by longitudinal brace members 54 and transverse members 56 and 56a (Figs. 1 and 4).

A power shaft 57 (Figs. 1, 2 and 3), arranged longitudinally of the tractor, extends through the housing 47 and is rotatably supported in bearings 58 mounted on the brace members 56 and 56a. Power to the shaft 57 is supplied from an engine 59, a fuel tank for which is indicated at 61. The engine 59 and tank 61 are carried adjacent the rear end of the frame 20 and the engine shaft is equipped with pulleys 62 which are connected with pulleys 63 on the power shaft 57 through V-belts 64.

Arranged within the housing 47 (Fig. 3) and mounted on the power shaft 57 are a pair of spaced friction discs 66 and 66a having their friction surfaces faced toward each other. The drive shafts 46 and 46a are arranged in co-axial alignment between the friction discs 66 and 66a and at opposite sides of the power shaft 57. The shafts 46 and 46a are in a plane parallel with the friction discs 66 and 66a so as to be at right angles to the power shaft 57. Each shaft 46 and 46a (Figs. 1 and 2) has its outer end rotatably supported in a bearing 67 which is carried at the top of an upright standard 68 secured to a longitudinal frame member 21 and 22. The drive shafts 46 and 46a (Figs. 3 and 4) project within the housing 47 from opposite sides thereof and have their inner adjacent ends rotatably supported in self-aligning bearings 71 and 71a (Figs. 3 and 9) which are suitably secured to a pair of oppositely arranged upright pivot arms 72 and 72a. The arms 72 and 72a are arranged at opposite sides of the power shaft 57 and have their lower ends pivoted on a common pin 75 which is carried in a tubular support 74 extended axially of the power shaft 57 at a position spaced therebelow, and connected between the intermediate transverse members 26 and 27 of the main tractor frame 20. It is seen, therefore, that the axes of the power shaft 57 and drive shafts 46 and 46a are arranged in a substantially common horizontal plane, and with the power shaft 57 extended at right angles between the inner-adjacent ends of the drive shafts 46 and 46a.

Mounted on the drive shafts 46 and 46a for rotation therewith, but for axial movement relative thereto, at positions spaced outwardly from the bearing members 71 and 71a, are hub units 70 and 70a (Fig. 3) which in turn carry friction wheels 73 and 73a. These friction wheels 73 and 73a are of a diameter substantially equal to the diameter of the friction discs 66 and 66a and have a peripheral friction surface adapted for frictional engagement with the frictional face or side surfaces of the friction discs 66 and 66a. It is contemplated that the friction discs 66 and 66a be spaced a distance apart such that the overall working clearance of a friction wheel 73 and 73a with the discs is in the neighborhood of about $\frac{1}{16}$ of an inch, when a friction wheel is in a neutral or centrally located position between the friction discs. Since power is transmitted to drive shafts 46 and 46a as a result of the frictional engagement of its associated friction wheel with one or the other of the friction discs 66 and 66a, it is seen that each drive shaft is operated independently of the other drive shaft, and with the direction of rotation and speed of rotation of a drive shaft being dependent on the relation of its corresponding friction wheel with a friction discs 66 and 66a.

The present invention provides for the operation of the friction wheels 73 and 73a in a complementary relation with the friction discs 66 and 66a to achieve a complete maneuverability of the tractor. This operation includes a concurrent movement of the friction wheels 73 and 73a to either advance or reverse the tractor without changing the speed of travel of the tractor; a movement of the friction wheels relative to the friction discs to either increase or decrease the speed of travel of the tractor in either a forward or reverse direction therefor; a movement of the friction wheels to relatively vary the speed of rotation of the drive shafts 46 and 46a to steer the tractor; a frictional disengagement of one of the friction wheels from a friction disc 66 or 66a while maintaining the other friction wheel in engagement with a friction disc, to accomplish a sharp turning movement of the tractor about one of the traction wheels 31 or 31a; and a movement of the friction wheels 73 and 73a into frictional engagement with a single one of the friction discs 66 or 66a to provide for a reversed relative rotation of the drive shafts 46 and 46a and a resultant turning movement of the tractor about a center point located substantially between the inner-adjacent ends of the drive shafts 46 and 46a, namely, within a turning radius defined by one-half the distance between the traction wheels 31 and 31a. For the purpose of convenience, the mechanisms embodied in the power system of this invention for operating the friction wheels 73 and 73a to provide various tractor operations will be separately described.

*Mechanism for advancing and reversing tractor*

With reference to Figs. 3 and 10, the front upper connecting member 52 between the upright corner members 51 is provided intermediate its ends with a pair of transversely spaced rearwardly extended supporting plates 81 and 81a, the front ends of which are secured, as by welding, to the front connecting member 52. In other words, the plate supports 81 and 81a project within the housing between the friction wheels 73 and 73a. Located between the supporting plates 81 and 81a with its front end 82 loosely resting on the front-connecting member 52 is a shiftable bar 83 (see also Fig. 11). The rear end 84 of the shiftable bar 83 rests on the rear-connecting member 52a and is formed with a notch 86 for loosely receiving an upright guide pin 87 on the connecting member 52a. It is thus seen that the shiftable bar 83 is movable axially of the power shaft 57 and is arranged in a vertically spaced position above the power shaft, so as to be between the inner-adjacent ends of the drive shafts 46 and 46a.

Carried intermediate the ends of the shiftable bar 83 is an upright pivot 88 for a T-shape lever 89. The pivot 88 is located intermediate the ends of the cross-arm 91 of the T-lever 89, with the leg 92 of such T-member extended rearwardly in substantial longitudinal alignment with the shiftable bar 83. The opposite ends of the cross arm 91 are pivotally connected at 93 and 93a (Figs. 9 and 10) with outwardly extended lateral projections 94 and 94a formed at the upper ends of the upright pivoted arms 72 and 72a.

The actuation of the T-member 89 to move the friction wheels 73 and 73a in relatively reversed directions axially of the power shaft 57 is accomplished by means including a shift lever 96, a spring connection, indicated generally as 97, a bell crank 98 and a pivoted lever 99. Supported on the top ends of the upright corner members 51, of the housing 47, and at a position spaced upwardly from the connecting members 52 and 52a and 53 is a top frame of an angle iron construction, indicated generally as 101. It is this frame 101 which carries the housing cover 48 and provides for a free longitudinal movement of the shiftable bar 83 on the top sides of the connecting members 52 and 52a.

The shift lever 96 (Figs. 10 and 16) includes a pin or shaft 102 rotatably supported in an upright sleeve bearing 103 carried on the frame 101 at the right hand side of the tractor. A horizontal arm 104 secured to the upper end of the pin 102 is equipped with a hand knob 106. Mounted on the lower end of the pin 102 is a second arm 107, the free end of which carries a pin 108 which projects downwardly through one end 105 of a tubular spring casing 109.

Inserted through the opposite end 112 of the casing 109 is a bolt 113 (Fig. 14). A coil spring 114 mounted about the bolt 113 is arranged between collars 116 and 117 loosely carried on the bolt, with the collar 117 at the inner end of the bolt 113 being engageable with stop screws 118 and the collar 116 near the outer end of the bolt 113 being engageable with stop screws 119, with the screws 118 and 119 being threadable through the casing 109 so as to project inwardly thereof. A spacer sleeve 121, integral with the collar 116, and projected outwardly from the casing end 112, is adapted for abutting engagement with an adjusting nut 122. Threadable on the outer end of the bolt 113 is a rod 123, which constitutes an adjustable extension for the bolt 113 and is held in an adjusted position by a lock nut 125.

The free end of the extension 123 is pivoted at 124 to one arm 126 of the bell crank 98 with the arm 126 being of an arcuate shape (Fig. 10). The bell crank 98 is pivoted at 127 on the connecting member 52a and its second arm 128 is pivoted at 129 to one end of the pivoted lever 99. The opposite end of the lever 99 is pivoted at 132 to the free end of the leg 92 of the T-member 89. The assembly of the bolt 113, bell crank 98, pivoted lever 99 and T-member 89 is such that all of these members are movable in a substantially common horizontal plane.

As shown in Fig. 10, the forward and reverse shifting mechanism, above described, is in its neutral position at which both of the friction wheels 73 and 73a are out of frictional engagement with the discs 66 and 66a. At this neutral position, the shift lever 96 extends axially of the drive shaft 46a with its hand knob 106 to the outside of the top frame 101. Further, in a neutral position of the shift lever 96, and referring to Fig. 14, the collars 116 and 117 are in contact engagement with their respective stop screws 119 and 118, so that the spring 114 is extended to its fullest length. As a result, any tendency of the friction wheels 73 and 73a to move out of their neutral positions is resisted in either direction by the spring 114 so that the friction wheels are yieldably held in their neutral or disengaged positions relative to the friction discs 66 and 66a.

To provide for a forward advance of the tractor, and assuming the direction of rotation of the power shaft 57 to be counterclockwise when viewed from the front of the tractor, the shift lever 96 is moved forwardly from its position shown in Figs. 10 and 14 to its stop position shown in Figs. 3 and 13, as defined by the engagement of arm 107 with the stop 95. At this forward position of the shift lever 96 the pivot 108 is moved off center relative to the shaft 102 whereby to yieldably lock the shift lever 96 against movement toward its neutral position. On this movement of the shift lever 96 to its forward position, the spring assembly 97 is moved rearwardly to in turn provide for a pivotal movement of the bell crank 98 in a clockwise direction about its pivot 127, as viewed in Figs. 3 and 10, a movement of the lever 99 towards the right, as viewed in these same two figures, from its position shown in Fig. 10 to its position shown in Fig. 3, and for a pivotal movement of the T-member 89 in a counter-clockwise direction about its pivot 88.

This pivotal movement of the T-member 89 provides for a concurrent movement in opposite directions of the inner-adjacent ends of the drive shafts 46 and 46a due to the pivotal support of the upright arms 72 and 72a on the common pivot 75 and the mounting of the inner ends of the drive shafts 46 and 46a in the self-aligning bearings 71 and 71a. As previously mentioned the friction wheels 73 and 73a, when disengaged from the friction discs 66 and 66a, are in a clearance relation with the friction discs, a distance on the order of about $\tfrac{1}{16}$ of an inch. Due to this relatively small clearance relation, the movement of the adjacent ends of the drive shafts 46 and 46a, axially of the power shaft 57 is readily accommodated by the self-aligning bearings 71 and 71a, and with the inner end of the drive shaft 46a being moved forwardly and the inner end of the drive shaft 46 rearwardly in response to the counter-clockwise movement of the T-lever 89. With this movement of the inner ends of the drive shafts 46 and 46a in relatively reversed directions, the friction wheel 73a is frictionally engaged with the front disc 66a, and the friction wheel 73 with the rear friction disc 66. As a result of this engagement of the friction wheels 73 and 73a with a corresponding disc 66 and 66a, the drive shafts 46 and 46a are rotated in the same direction to provide for the travel of the tractor in a forward direction. Further, and as will best appear from consideration of Fig. 13, the bearing pressure of the wheels 73 and 73a with the discs 66 and 66a is maintained uniform by virtue of the compression of the spring 114 against the collar 117 as a result of the movement of the collar 116 out of engagement with the stop screws 119 and toward the stop screws 118. The spring 114 thus acts uniformly on both friction wheels 73 and 73a by virtue of the connection of the upright arms 72 and 72a through the T-member 89.

To reverse the travel of the tractor, the shift lever 96 is moved from its forward position, shown in Fig. 13, through its neutral position, shown in Fig. 14, and then rearwardly from its neutral position to its reverse position, shown in Fig. 15, as defined by the engagement of the arm 107 with the stop 95. In this reverse position of the shift lever 96, it will be noted that the pin 108 is again moved to an off-center position relative to the pin 102 so as to lock the shift lever 96 against movement toward its neutral position. During the movement of the lever 96 from its neutral position to its reverse position, the spring assembly 97 is moved forwardly, toward the front friction disc 66a, whereby the spring 114 is compressed by the collar 117 against the collar 116. Further, the bell crank 98, pivoted lever 99, T-member 89 and inner adjacent ends of the drive shafts 46 and 46a are reversely moved, relative to their movement in response to the movement of the shift lever from a neutral position to its forward position, whereby the friction wheel 73 is moved into engagement with the disc 66. The friction wheels 73 and 73a are thus reversed relative to their direction of rotation for a forward advance of the tractor to in turn provide for a reversed rotation of the drive shafts 46 and 46a.

Likewise, with the spring 114 compressed against the collar 116, any movement of the friction wheels 73 and 73a out of engagement with the discs 66 and 66a is resisted by the pressure of the spring 114, which functions to maintain the bearing pressure between the friction discs and the friction wheels uniform. This bearing pressure may be varied by adjustment of the bolt extension 123, with a corresponding neutral position of the spring being obtained by adjustment of the nut 122.

The movement of the friction wheels 73 and 73a axially of their corresponding drive shafts 46 and 46a to vary the speed of rotation of the drive shafts 46 and 46a for tractor operating and steering purposes will now be described.

*Tractor speed change and steering mechanism*

The speed change and steering mechanism, embodied in the system of this invention, will be best understood from a consideration of Figs. 3 and 4 taken in connection with Figs. 5 and 6, which latter figures show the essential elements in the speed change and steering mechanism.

A pair of actuating bars 141 and 142 (Figs. 3 and 4) are arranged in a transversely spaced relation longitudinally of and spaced above the shiftable bar 83, with the rear ends 143 and 144 of the actuating bars 141 and 142, respectively, terminating substantially at the rear end 84 of the shiftable bar 83. The rear ends 143 and 144 of the actuating bars are of a flat construction and laterally inclined toward each other so as to be in an overlapping relation (Figs. 3 and 5). The assembly relation of the actuating bars 141 and 142 with their associated friction wheels 73 and 73a, respectively, is the same, so only the assembly of the actuating lever 141 with its friction wheel 73 will be referred to in detail. Similar numerals will be used, therefore, to designate like parts in these assemblies.

The rear end 143 of the actuating bar 141 is pivotally connected at 146 with a rock arm 147 (Figs. 3, 4, 5 and 6) which is mounted on an upright rock shaft 148. The rock shaft 148 has its upper end rotatably supported in a top plate member 149, welded to the top frame 101, while its lower end is supported in a lower plate 151 secured to the rear connecting member 56a. Adjacent its lower end, the rock shaft 148 carries a pair of vertically spaced rock arms 152 the free ends of which are pivoted at 153 to one of the ends of connecting levers 154. The other ends of the levers 154 are pivoted at 156 to a ring member 157 having inwardly extended projections 158 receivable in an annular groove 159 formed in the hub member 70 for the friction wheel 73. The rock arms 152, levers 154 and ring assembly 157 thus constitutes what might be termed a slidable yoke member relative to the hub 70. Thus, in response to a pivotal movement of the rock arm 147, the free ends of the rock arms 152 are moved in parallel arcuate paths which extend substantially axially of the drive shaft 46 to in turn provide for a movement of the friction wheel 73 axially of the drive shaft 46.

The front end portions of the actuating bars 141 and 142 are formed with oppositely arranged rack sections 161 and 162, respectively, and are movably supported for longitudinal movement in cooperating horizontally disposed U-shape guides or brackets 163 and 164, also respectively, having the free ends of their legs in an overlapping relation whereby to form a guide sleeve of a substantially rectangular shape in transverse cross section (Figs. 5 and 7). The front end sections of the actuating bars 141 and 142 are enclosed within a square tubular casing 168 which extends forwardly of the housing 47 at a position between the connecting member 52 and the top frame 101 (Figs. 1 and 5). A bracket 169 (Figs. 4 and 5), integrally formed at the lower rear end of the casing 168, is secured as by screws 171 to the connecting member 52, and an extension 172 for the top wall 173 of the casing 168 is secured to the top frame 101. Formed in the casing top wall 173 (Figs. 5 and 6) is a longitudinally extended slot 174 which is closed by a pair of sliding plates 176 and 176a arranged at opposite sides of the top wall 173. Located between the sliding plates 176 and within the slot 174, but of a length less than the length of the slot 174, is a guide plate 177.

A sleeve bearing 178 (Figs. 5 and 7) is secured to and projects upwardly from the upper slide plate 176 and rotatably supports a shaft assembly comprising a tubular shaft 179 and a solid shaft 181 rotatably mounted within the tubular shaft. The tubular shaft 179 extends through the slide plates 176 and 176a and the guide plate 177 with its lower end 183 terminating within the U-shape brackets 163 and 164. A pinion gear 184 mounted on the lower end of the shaft 179 is adapted for concurrent meshing engagement with the rack sections 161 and 162 of the actuating bars 141 and 142, respectively.

The shaft 181 extends through the slide plates 176 and 176a, the guide plate 177 and the brackets 163 and 164 so as to project within the casing 168 downwardly from the lower end of the tubular shaft 179. Mounted on the shaft 181, at a position below the pinion gear 184, is a pinion gear 186 which is in meshed engagement with a rack member 187 secured to a side wall of the casing 168. As shown in Fig. 1, the tubular or steering shaft 179 is equipped with a large hand wheel 188 for turning purposes, while the solid or speed-change shaft 181 is equipped with a small hand wheel 189 which is located above the hand wheel 188, with both of the hand wheels 188 and 189 being arranged forwardly of the tractor operator seat 49 at a height conveniently accessible to the operator.

To steer the tractor through a relative change in speed of the traction wheels 31 and 31a, the hand wheel 188, as viewed in Fig. 6, is turned in a clockwise direction for steering to the right, and in a counter-clockwise direction for steering to the left. Thus, assume the actuating bars 141 and 142 and friction wheels 73 and 73a to be in their relative positions shown in full lines in Fig. 6. Further, let it be assumed that the friction wheels 73 and 73a are in their full-line positions, as also shown in Fig. 6, in which the wheel 73 is frictionally engaged with the rear disc 66, and the wheel 73a with the front disc 66a, so as to provide for a forward advance of the tractor. On rotation of the hand wheel 188 in a clockwise direction, as viewed in Fig. 6, the pinion gear 184 acts upon the rack sections 161 and 162 such that the actuating bar 141 is moved forwardly, or upwardly, as viewed in Fig. 6, concurrently with a movement of the actuating bar 142 rearwardly, or downwardly, as also viewed in Fig. 6. The forward movement of the actuating bar 141 provides for a pivotal movement of the rock arm 147 associated therewith in a counter-clockwise direction, with this movement in turn providing for a counter-clockwise movement of the rock arm 152 and an axial movement of the friction wheel 73 toward the left, and transversely of the friction disc 66 toward the outer periphery thereof. By virtue of this axial movement of the friction wheel 73 in a direction toward the outer periphery of the friction disc 66, the speed of rotation of the drive shaft 46, corresponding thereto, is increased.

Concurrently with the increase in speed of rotation of the friction wheel 73, the rotational speed of the friction wheel 73a is reduced as a result of the rearward movement of the actuating bar 142 and the movement of the rock arms 147 and 152 corresponding thereto in a counter-clockwise direction, as viewed in Fig. 6, whereby to move the friction wheel 73a inwardly toward the center of the friction disc 66a, with this movement resulting in a reduced rotational speed of the frictional wheel 73a and in turn of the drive shaft 46a.

With the increase in rotational speed of the drive shaft 46 and the decrease in rotational speed of the drive shaft 46a, the traction wheel 31 is driven faster than the traction wheel 31a so as to provide for a turning to the right of the tractor.

For a steering of the tractor to the left, the hand wheel 188 is turned to the left or in a counter-clockwise direction, as viewed in Fig. 6, whereby the pinion gear 184, through the rack sections 161 and 162, moves the actuating rod 142 in a forward direction and the actuating rod 141 in a rearward direction. This relative movement of the actuating rods 141 and 142, in the manner previously above described for a right turn of the tractor, provides for a concurrent movement of the friction wheels 73 and 73a to the right, as viewed in Fig. 6, whereby the drive shaft 46a is driven at a faster speed than the drive shaft 46. As a result, the traction wheel 31a is rotated at a speed faster than the traction wheel 31 so that steering takes place to the left, or about the traction wheel 31.

During the operation of the hand wheel 188 for tractor steering purposes, the steering shaft 179 and in turn the pinion gear 184 are held against free movement longitudinally of the casing 168 by means including a clamping screw 191 (Figs. 6 and 8) which has an enlarged shank portion 192 adapted for abutting engagement with the top side of the slide plate 176, and a shank portion 193 of a reduced section loosely extended through the slide plate 176 and guide plate 177 for threadable engagement within the lower slide plate 176a. Thus, on tightening of the screw 191, the plates 176 and 176a are moved into frictional engagement with opposite sides of the casing top wall 173. By virtue of the assembly of the steering shaft 179 and speed-change shaft 181 within the sleeve bearing 178 on the upper slide plate 176, the pinion gear 184 is frictionally held stationary relative to the actuating bars 141 and 142. It is contemplated that this frictional holding action be sufficient to prevent a free movement of the gear 184 longitudinally of the casing 168 while permitting a manual movement of the gear longitudinally of the casing. In other words the shaft 179 and gear 184 are manually movable to changed positions against the frictional holding action of the side plates 176 and 176a.

In the event the friction wheels 73 and 73a are in either of their extreme moved positions transversely of the discs 66 and 66a, actuation of the steering wheel 188 in either direction will effect a transverse movement of only one of the wheels away from its extreme position to accomplish a desired turn. This movement of only one of the wheels takes place against the frictional holding of the slide plates by the clamp 191, and is accomplished by the travel of the gear 184 along the actuating bar 141 and 142 corresponding to the friction wheel not being moved. Thus the actuating bar 141 and 142 corresponding to the friction wheel 73 or 73a, which is not moved, remains stationary so as to function as a rack relative to the gear 184, whereby the gear 184 only actuates the actuating bar corresponding to the friction wheel being moved. As a result, the gear 184 and one of the actuating bars are moved longitudinally relative to the casing 168, while the other actuating bar remains stationary relative to the casing 168.

A change in the rotational speed of the drive shafts 46 and 46a, and in turn of their corresponding traction wheels 31 and 31a, is accomplished by rotation of the small hand wheel 189. For an easier manipulation of the hand wheel 189, the clamping screw 191 may be loosened so as to provide for a free slidable movement of the plates 176, 176a and 177 longitudinally of the casing 168. Thus, referring to Fig. 6, assume the actuating bars 141 and 142 and the friction wheels 73 and 73a to be in their relative positions, as shown in full lines. To increase the speed of rotation of the drive shafts 46 and 46a, the hand wheel 189 is turned in a clockwise direction, as viewed in Fig. 6. As a result of this rotation of the hand wheel 189 and speed-change shaft 181, the gear 186 is moved forwardly along the rack bar 187. Since the rack sections 161 and 162 of the actuating bars 141 and 142, respectively, are in continuous meshing engagement with the pinion gear 184, the actuating rods are locked against relative movement and are movable together in a forward direction from their full-line positions, shown in Fig. 6, to their dotted-line positions, shown in the same figure.

This concurrent forward movement of the actuating rods 141 and 142 provides for a clockwise movement of the rock arm 152 corresponding to the friction wheel 73a and for a counter-clockwise movement of the rock arm 152, corresponding to the friction wheel 73, whereby the friction wheels 73 and 73a are simultaneously moved in directions away from each other, and toward the outer peripheries of their respective discs 66 and 66a. The rotational speeds of the drive shafts 46 and 46a, and in turn of the traction wheels 31 and 31a, are thus simultaneously increased by like amounts.

To simultaneously reduce the rotational speeds of the drive shafts 46 and 46a by like amounts, the hand wheel 189 is rotated in a counter-clockwise direction, as viewed in Fig. 6, so as to provide for a rearward movement of the actuating rods 141 and 142 and a simultaneous movement of the friction wheels 73 and 73a inwardly toward each other. The desired speed of rotation of the drive shafts 46 and 46a is then maintained by merely tightening the clamping screw 191.

*Sharp turn or spinner mechanism*

A turning movement of the tractor within a distance defined by the transverse distance between the traction wheels 31 and 31a is accomplished by means including the pivoted upright arms 72 and 72a (Figs. 9 and 10), the T-member 89 and shiftable bar 83, previously described. Pivoted at 201 on the supporting plate 81 is an operating lever 202 which extends laterally of the housing 47 so as to project outwardly from the side thereof opposite the shift lever 96. The inner end of the operating lever 202 is pivoted at 203 to the shiftable bar 83.

Prior to any manipulation of the lever 202 for turning the tractor around within the width of its own tracks, the shift-lever 96 is moved to its neutral position, shown in Fig. 10, whereby both of the friction wheels 73 and 73a are out of frictional engagement with the discs 66 and 66a. On forward movement of the lever 202 from its full-line position to its dotted-line position, shown in Fig. 10, the shiftable rod 83 is moved rearwardly from its full-line position to its dotted-line position, also shown in Fig. 10, with the T-member 89 being movable with the shiftable bar 83 to its dotted-line position, shown in the same figure. As a result of the pivotal support of the upright arms 72 and 72a on the common pivot 75, and the pivotal connection of the upper ends of these arms at 93 and 93a, respectively, with the cross arm 91 of the T-member 89, the inner-adjacent ends of the drive shafts 46 and 46a are simultaneously moved rearwardly toward the rear friction disc 66 to in turn provide for the frictional engagement of the wheels 73 and 73a with the disc 66. With the wheels 73 and 73a in frictional engagement with the common disc 66, the drive shafts 46 and 46a are rotated in relatively reversed directions, so that the spinning or turning movement of the tractor within the width of its own tracks takes place in a direction towards the right, namely, the traction wheel 31 is advanced while the traction wheel 31a is reversed. By moving the lever 202 rearwardly from its full-line position, shown in Fig. 10, the friction wheels 73 and 73a are moved into frictional engagement with the front disc 66a to provide for a spinning movement of the tractor in a direction towards the left.

The system also includes the provision of means for independently braking the traction wheels 31 and 31a to attain a complete stopping of the machine, and the utilization of the braking mechanism for steering purposes, in lieu of operating the hand wheel 188, whereby to increase the overall flexibility of operation of the tractor.

*Braking mechanism*

This braking mechanism includes a pair of equalizing levers 221 and 221a (Figs. 3, 9 and 12) corresponding to the drive shafts 46 and 46a. Since each equalizing lever 221 and 221a is of a like construction and similarly assembled in the system of this invention, only the lever 221 will be described in detail. As shown in Fig. 12, the lever 221 is of a substantially T-shape with the cross arm 222 intermediate the ends thereof being formed with a central notch or recess 223. Arranged at opposite sides of the central notch 223 is a pair of oppositely arranged notches 224 and 226 which are open to opposite sides of the cross arm 222.

The equalizing lever 221 has the cross arm 222 thereof positionable at the rear end of the plate support 81 (Figs. 3 and 9) while the free end 227 of the leg section 228 thereof is arranged between the cross arm 91 of the T-member 89 and the lateral projection 94 of the upright arm 72 for pivotal connection with the pivot 93. The rear end of the supporting plate 81 is provided with an upright guide pin 229 which is loosely receivable within the central notch 223 of the equalizing cross arm 222.

Associated with the equalizing levers 221 and 221a are corresponding equalizing links 231 and 231a which are also of a substantially T-shape and are pivoted intermediate the ends of their cross arms 233 and 233a on the pins 229 and 229a, all respectively. The links 231 and 231a are of a like construction and similarly assembled in the system, so that only the link 231 and its association with its corresponding drive shaft 46 will be referred to in detail.

The cross arms 233 (Fig. 9) is provided at its opposite ends with downwardly extended pins 234 and 235 which are loosely receivable in the reversed notches 224 and 226, respectively, of the equalizing lever 221. The leg portion 236 of the equalizing link 231 extends forwardly over the supporting plate 81 for pivotal connection of its free end at 237, with one end of a lever 238, the opposite end of which is pivoted at 239 to a crank arm 241 rotatably supported in a bearing 242 which is suitably secured to the connecting member 52. The lever 238 is extended transversely of the housing 47, and in turn of the tractor, and the bearing 242 extends longitudinally of the housing. A second crank arm 243 connected on a shaft 244, which is common to the crank arm 239, is pivoted at 246 to the top end of an upright lever 247, the lower end of which is pivoted at 248 to a foot brake lever 249.

The brake lever 249 is mounted at its rear end on a shaft 251 (Figs. 2, 3 and 17) extended transversely of the tractor and rotatably supported in a bearing 250 carried on the forward end of the longitudinal tubular member 54 and in a bearing 252 which is carried on an upright standard 255 secured to the longitudinal frame member 21. A rock arm 260, at the outer end of the shaft 251, is provided at its free end with a sleeve bearing 253 which receives in a lost motion connection a rod 254 for operating a brake unit, indicated generally as 256. The front end of the rod 254 carries adjusting nuts 257 which are arranged at opposite ends of the sleeve bearing 253.

The brake unit 256 comprises a brake drum 258 mounted on the drive shaft 46. A brake band 259, frictionally engageable with the brake drum 258, has its adjacent ends 261 yieldably connected together through a spring connection 262, and its closed side 263 supported by springs 264 from an upright standard 266 on the longitudinal frame member 21. Connecting links 267 have one of their ends pivoted at 268 to the brake band 259 at positions spaced from the band ends 261, while their opposite ends are connected through a common pivot 269 with the rear end of the connecting rod 254.

In the operation of the brake system it is contemplated that the drive shaft, corresponding to the brake lever to be operated, be substantially out of a driven relation with the power shaft 57 at the time braking action takes place on the drive shaft. In other words, the brake will be applied on the drive shaft before power thereto is completely removed. Thus, for a braking action on the drive shaft 46, assume that the shift lever 96 is in its position providing for a forward advance of the tractor, as shown in Fig. 3, whereby the T-member 89 is pivotally moved to provide for a frictional engagement of the wheel 73a with the disc 66a, and of the wheel 73 with the disc 66. This position of the T-member 89 in Fig. 3 corresponds to its position shown in full lines in Fig. 9. By virtue of the loose reception of the pins 234 and 235 within the notches 224 and 226, movement of the T-member 89 in response to a movement of the shift lever 96, takes place without effecting any movement of the equalizing link 231. In other words, the pin and slot connections, above described, provide for a lost-motion connection between the equalizing lever 221 and the equalizing link 231.

On depressing the brake lever 249, and referring to Fig. 9, the equalizing link 231 is moved to its dotted-line position, shown in Fig. 9, by the action of the levers 247 and 238, and cranks 241 and 243, the moved positions of which are also shown in dotted lines in Fig. 9. On movement of the equalizing link 231 from its full-line position to its dotted-line position, the pin 234 initially engages the bottom of the recess 224 whereby the equalizing lever 221 is moved forwardly, to in turn provide for a forward movement of the upright support 72, to a position defined by the engagement of the pin 235 with the bottom of the recess 226. With both of the pins 234 and 235 in abutting engagement with the bottom of their corresponding recesses 224 and 226, the equalizing link 231 is locked against further movement, with this locked position defining a neutral position of the friction wheel 73 relative to the discs 66 and 66a so as to cut off the supply of any power to the drive shaft 46.

Just as the pressure of the friction wheel 73 on the disc 66 is being released by the depression of the brake lever 249, the pressure of the brake band 259 is applied to the brake drum 258 so that when the friction wheel 73 has been brought to its neutral position the brake is fully applied. The drive shaft 46, and in turn its corresponding friction wheel 31, is thus braked against further rotation. It will be appreciated that as the brake is applied to the traction wheel 31, the traction wheel 31a will continue to have power supplied thereto, so that unless the brake mechanisms corresponding to the traction wheels 31 and 31a are simultaneously applied to the drive shafts 46 and 46a, a turning movement of the tractor in the direction of the traction wheel being braked will take place.

On a release of the brake lever 249 the T-member 89 is returned to its position providing for a forward advance of the tractor as a result of the pressure applied thereon by the spring 114 of the spring connection 97. Conversely, it will be appreciated that the movement of the T-member 89 out of what might be termed its normal position and providing for the disengagement of the friction wheel 73 from the friction disc 66, in response to the actuation of the brake lever 249, takes place against the pressure of the spring 114.

*Summary*

From a consideration of the above description, it is seen that the invention provides a combination power transmission and steering system for a three wheel tractor that provides for what might be called a finger-tip control of the tractor by the operator, and for a complete maneuverability of the tractor to readily accomplish all farming operations. As best appears from a consideration of Figs. 1 and 2, the housing 47 for the system is located adjacent the front end of the tractor, and the tractor operator's seat 49 is carried on the housing cover 48, so that the ground immediately ahead of the tractor is in full view of the tractor operator. Thus, for example, a cultivator implement, indicated generally at 270 in Figs. 1 and 2, and movably mounted through means including links 271 and 272 to the tractor frame 20 has all of its shovels 273 in the full vision of the tractor operator. Further, the hand-operated levers 274 for raising and lowering the cultivator 270 can be positioned for ready manipulation by the operator.

As a result of the full maneuverability of the tractor, and the complete visibility of the farm implement by the tractor operator, the cultivator 270 is manipulated as a self-propelled unit capable of following any row contour and able to work in very close quarters. Further, the system of this invention eliminates the use of any differential or clutch mechanisms, and accomplishes a forward or reverse advance of the tractor smoothly and quickly.

Also, the tractor is readily adapted to be operated with equal facility in either a forward or a reverse direction, depending upon the use of the tractor for either pushing or pulling purposes. Thus for instance, in the event the cultivator is replaced by a plow (not shown) which is to be pulled, rather than pushed, the operator's seat 49 may be assembled on a forward extension (not shown) of the casing 168 so as to face the castor wheel 32. Then by merely pivotally connecting the rear end 143 of the actuating rod 141 (Fig. 3) with the rock arm 147 corresponding to the drive shaft 46a, and pivotally connecting the rear end 144 of the actuating rod 142 with the rock arm 147 corresponding to the drive shaft 46, the system of this invention is operable to provide for the manipulation of the tractor, with the castor wheel 32 utilized as a front wheel, in all respects similar to its operation, described above, with the castor wheel 32 utilized as a rear wheel.

Although the invention has been described with respect to a preferred embodiment thereof, it is to be understood that it is not to be so limited since changes and modifications can be made therein which are within the full intended scope of this invention, as defined by the appended claims.

I claim:

1. A power transmission system comprising, a power shaft having a pair of spaced friction discs mounted thereon, a pair of co-axial drive shafts normal to said power shaft arranged between said discs, means supporting said drive shafts such that their adjacent ends are movable axially of said power shaft, a friction wheel mounted on each of said drive shafts for movement axially thereof, with each friction wheel being adapted to frictionally engage one or the other of said friction discs, means for axially moving said friction wheels including a pair of link systems corresponding to said wheels, with each link system having an operating lever extended axially of said power shaft at a position between said wheels, means movably supporting said levers for longitudinal movement, means connecting said levers for concurrent and relative longitudinal movement to provide for a concurrent and relative movement of said wheels axially of said drive shafts, a first actuating means for concurrently moving said operating levers, and a second actuating means for relatively moving said operating levers.

2. A power transmission system comprising, a power shaft, a pair of spaced friction discs mounted on said power shaft, a pair of drive shafts arranged between said discs at opposite sides of and normal to said power shaft, a friction wheel mounted on each of said drive shafts for rotational movement therewith and axial movement thereon, means supporting said drive shafts for movement toward and away from said friction discs to provide for the frictional engagement of a friction wheel with one of said friction discs, means for axially moving each friction wheel including a bell crank, means movably connecting one arm of said bell crank with said friction wheel, an actuating lever movably connected with the other arm of said bell crank, with the bell crank and actuating lever for each friction wheel being relatively assembled such that the actuating levers are arranged in a substantially parallel relation adjacent to each other, gear rack portions oppositely arranged on adjacent sides of said levers, means including a rotatable gear element concurrently engageable with said rack portions for moving said levers relative to each other whereby the friction wheels corresponding thereto are moved axially of their associated drive shafts to relatively vary the speeds thereof, and means for moving said actuating levers together as a unit to axially move said friction wheels to vary the rotational speeds of said drive shafts by like amounts.

3. A power transmission system comprising, a power shaft, a pair of co-axial drive shafts normal to said power shaft and arranged at opposite sides of said power shaft, a pair of friction discs on said power shaft arranged at opposite sides of said drive shafts, a friction wheel on each drive shaft for frictionally engaging a friction disc, means providing for the frictional engagement and disengagement of said friction wheels with said friction discs, means movably supporting each friction wheel for movement axially of a corresponding drive shaft, a pair of independent means for axially moving said friction wheels each of which includes an actuating member and a lever system, means movably connecting a lever system between a friction wheel and an actuating member such that the lever systems are reversely moved in response to a movement of said actuating members in the same direction, with said actuating members being arranged in a spaced parallel relation, means supporting said actuating members for longitudinal movement, oppositely arranged rack portions on said actuating members, a gear common to said rack portions, a tubular shaft for said gear projected outwardly from said supporting means, a rack member fixed on said supporting means and extended longitudinally of said actuating members, a second gear engageable with said rack member, a shaft for said second gear positioned within said tubular shaft, an adjustable member mounted on said supporting means for movement longitudinally of said actuating members, with said gear shafts being carried on said adjustable member, said actuating members on rotation of said tubular shaft, being moved in opposite directions whereby to axially move said wheels in opposite directions to relatively vary the rotational speeds of said drive shafts, and said actuating members and adjustable member, on rotation of said inner shaft, being moved in the same direction whereby to axially move said wheels in opposite directions to vary the rotational speeds of said drive shafts by like amounts.

4. A power transmission system including a power shaft, a pair of coaxial drive shafts arranged at opposite sides of said power shaft, a pair of friction discs on said power shaft arranged at opposite sides of said drive shafts, a friction wheel on each of said drive shafts frictionally engageable with one or the other of said friction discs, means supporting said drive shafts for movement axially of said power shaft to provide for the engagement and disengagement of said wheels with said discs, a lever system including a rockable member for concurrently moving said wheels into and out of frictional engagement with corresponding ones of said friction discs, with said wheels being out of frictional engagement with said discs at one moved position of said rockable member, means for yieldably holding said rockable member in said one moved position therefor, and means, when said rockable member is in said one moved position therefor, for moving said lever system and rockable member as a unit to provide for the movement of said wheels into frictional engagement with only one of said discs.

5. A power transmission system including a power shaft, a pair of drive shafts normal to said power shaft and arranged at opposite sides of said power shaft, a pair of friction discs mounted on said power shaft, friction wheels mounted on the adjacent ends of said drive shafts, means supporting said drive shafts such that the adjacent ends thereof are movable axially of said power shaft to provide for the frictional engagement and disengagement of said wheels with said discs, a first means for concurrently moving said adjacent shaft ends in opposite directions so that each of said wheels is in frictional engagement with a corresponding disc whereby said drive shafts are rotated in the same direction, means for yieldably holding said first means in a position at which said wheels are disengaged from said discs, and a second means, when said wheels are in frictionally disengaged positions, for moving said first means as a unit against the action of said yieldable means to provide for the concurrent movement of said adjacent shaft ends in the same direction whereby to frictionally engage said wheels with only one of said discs so that said drive shafts are rotated in relatively reversed directions.

UMMO F. LUEBBEN.

REFERENCES CITED

The following references are of record in the file of this patent:

UNITED STATES PATENTS

| Number | Name | Date |
|--------|------|------|
| 757,379 | Worth et al. | Apr. 12, 1904 |
| 975,290 | Scharf | Nov. 8, 1910 |
| 1,038,918 | Marble | Sept. 17, 1912 |
| 1,045,572 | Scharf | Nov. 26, 1912 |
| 1,170,877 | Colwell et al. | Feb. 8, 1916 |
| 1,272,287 | Martell et al. | July 9, 1918 |
| 1,318,019 | Simpson | Oct. 7, 1919 |
| 2,311,393 | Honeywell | Feb. 16, 1943 |